(No Model.)
L. KOHN.
CULINARY STRAINER.
No. 313,676. Patented Mar. 10, 1885.
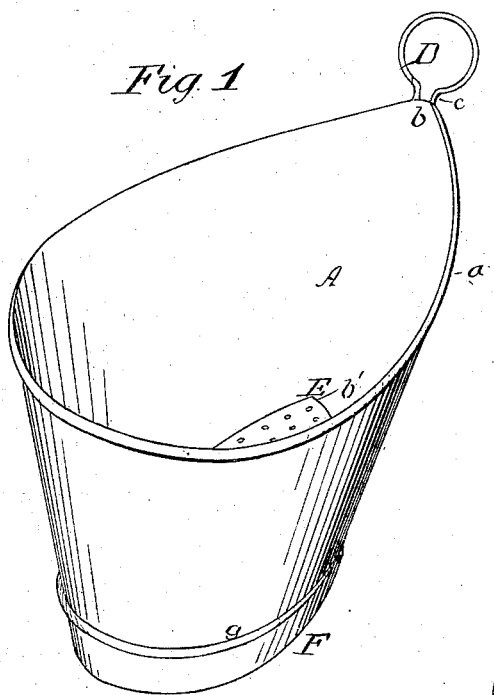
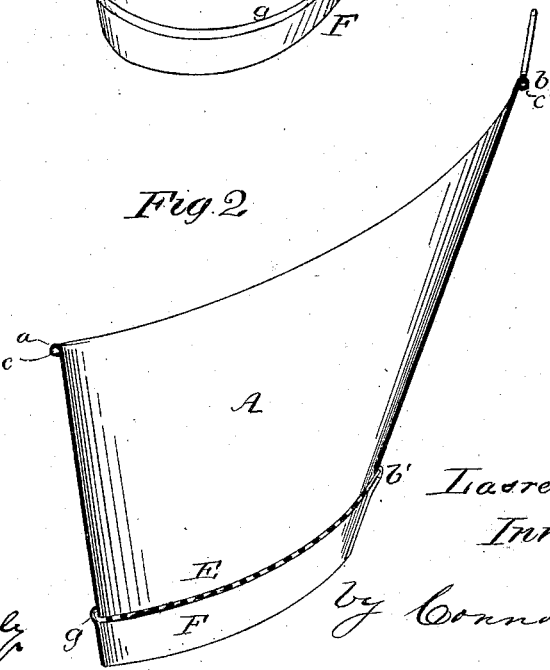
Witnesses
A. A. Connolly
W. C. Chaffee
Isadres Kohn
Inventor
by Connolly Bros
Attys

UNITED STATES PATENT OFFICE.

LASRES KOHN, OF NEW YORK, N. Y.

CULINARY STRAINER.

SPECIFICATION forming part of Letters Patent No. 313,676, dated March 10, 1885.

Application filed August 29, 1884. (No model.)

*To all whom it may concern:*

Be it known that I, LASRES KOHN, a subject of the Sultan of Turkey, Europe, residing at New York, in the county of New York and State of New York, have invented certain new and useful Improvements in Culinary Strainers; and I do hereby declare the following to be a full, clear, and exact description of the invention, reference being had to the accompanying drawings, which form part of this specification, in which—

Figure 1 is a perspective view, and Fig. 2 is a vertical sectional view, of a strainer constructed according to my invention.

My invention has relation to that class of culinary utensils known as "soup-strainers," and has for its object the provision of a strainer which shall be convenient to use, and which shall be specially adapted to the service it is intended to perform.

My invention consists in the novel construction of a funnel-shaped strainer, having a curved or inclined perforated bottom and a bail or ring by which it is held in the hand or hung upon the wall, as hereinafter described, and specifically claimed.

In the accompanying drawings, A designates the body of the strainer, made of sheet metal, preferably tin, and of a flaring or funnel shape. The upper and lower edges are curved upward toward the back part, and converge to the points or angles $b$ $b'$.

Around the upper edge, $a$, is fitted a wire, $c$, incased in the bead or flange $c'$, and bent or rounded at the angle $b$, where it extends beyond the bead $c'$, so as to form a ring, D, by which the utensil may be grasped or hung upon a nail or hook.

The peculiar curvature of the upper edge of the funnel specially adapts the utensil to be so hung when in use, as such formation causes the lower or discharge end to project out from the surface against which the funnel is placed, and maintains the perforated diaphragm at a suitable angle. Again, such curvature provides a convenient surface for the application of the hand, when the utensil is held by the latter, and dispenses with the necessity of a separate handle, such as is usually applied to soup-strainers.

The strainer proper consists of a sheet-metal diaphragm, E, suitably pierced or perforated. It is attached to the lower edge of the body by being flanged and soldered, after which a rim, F, beaded at $g$, to cover the edge of the diaphragm, is secured by soldering to the body A. As shown, the perforated diaphragm is curved upwardly toward the point $b'$, located at the back part of the funnel. This curvature offers an inclined surface over which the material to be strained flows, the thorough and rapid straining of the soup being thereby facilitated. The residue collects in the lower angle, and hence the upper portion of the strainer is kept clean and prevented from clogging.

The utensil may be used for straining other material besides soup, and the perforations in the diaphragm may be of any suitable fineness.

What I claim as my invention is—

The culinary strainer consisting of the funnel-shaped body A, having the upwardly-curved edge $a$, terminating or converging to the angle $b$, and the coincidentally-curved straining-diaphragm E, said edge $a$ being provided with the strengthening-wire $c$, bent to form the ring D, substantially as shown and described.

In testimony that I claim the foregoing I have hereunto set my hand this 26th day of August, 1884.

LASRES KOHN.

Witnesses:
 MAX ROSENFELDT,
 GEORGE F. ESCHBACH.